United States Patent
Kohlmeier-Beckmann et al.

(10) Patent No.: US 9,701,411 B2
(45) Date of Patent: Jul. 11, 2017

(54) EVACUATION SLIDE WITH A GUIDANCE MARKING

(71) Applicant: Airbus Operations GmbH, Hamburg (DE)

(72) Inventors: Carsten Kohlmeier-Beckmann, Hamburg (DE); Fred Raszpir, Hamburg (DE); Gary Leegate, St. Petersburg, FL (US)

(73) Assignee: Airbus Operations GmbH, Hamburg (DE)

( * ) Notice: Subject to any disclaimer, the term of this patent is extended or adjusted under 35 U.S.C. 154(b) by 29 days.

(21) Appl. No.: 14/565,674

(22) Filed: Dec. 10, 2014

(65) Prior Publication Data

US 2016/0167794 A1    Jun. 16, 2016

(51) Int. Cl.
*B64D 25/14* (2006.01)
*A62B 1/20* (2006.01)

(52) U.S. Cl.
CPC ........... *B64D 25/14* (2013.01); *A62B 1/20* (2013.01)

(58) Field of Classification Search
CPC ........ B64D 25/14; B64D 25/08; B64D 25/00; B64D 9/00; A62B 1/20; A62B 3/00; Y10S 244/905
See application file for complete search history.

(56) References Cited

U.S. PATENT DOCUMENTS

| | | | | |
|---|---|---|---|---|
| 3,463,915 A * | 8/1969 | Day | B60Q 7/00 193/25 B |
| 3,845,920 A * | 11/1974 | Satterfield | B64D 25/14 182/48 |
| 3,973,645 A * | 8/1976 | Dix | B64D 25/14 182/48 |
| 4,018,321 A * | 4/1977 | Fisher | B64D 25/14 182/48 |
| 4,333,546 A * | 6/1982 | Fisher | B64D 25/14 182/48 |
| 4,401,050 A * | 8/1983 | Britt | A62B 3/00 116/205 |
| 4,684,079 A * | 8/1987 | Miller | B64D 25/14 193/25 B |

(Continued)

FOREIGN PATENT DOCUMENTS

DE   102010055704   6/2012
WO   2012084184    6/2012

*Primary Examiner* — Katherine Mitchell
*Assistant Examiner* — Shiref Mekhaeil
(74) *Attorney, Agent, or Firm* — Greer, Burns & Crain, Ltd.

(57) ABSTRACT

An evacuation slide comprises a sliding face having a top end portion adapted to be positioned adjacent to an exit of a region to be evacuated, and a bottom end portion adapted to be positioned adjacent to an escape route leading away from, and at a lower height, than the region. The sliding face, at the top end portion, comprises a flat porch section connected to an inclined section of the sliding face via a transition section. The sliding face has at least one of a first guidance marking placed in the flat porch section and having a shape and orientation adapted indicate a predefined evacuation direction in the inclined section of the sliding face and a second guidance marking placed in the transition section and having a shape and orientation adapted to indicate a separation between the flat porch section and the inclined section.

21 Claims, 4 Drawing Sheets

(56) References Cited

U.S. PATENT DOCUMENTS

| | | | | |
|---|---|---|---|---|
| 4,754,266 | A * | 6/1988 | Shand | A62B 3/00 340/309.4 |
| 4,846,422 | A * | 7/1989 | Fisher | B64D 25/14 182/48 |
| 5,906,340 | A * | 5/1999 | Duggal | B64D 25/14 182/48 |
| 6,443,259 | B1 * | 9/2002 | Oney | B64D 25/14 182/18 |
| 6,959,658 | B2 * | 11/2005 | Gronlund | B64D 25/14 112/475.01 |
| 7,531,960 | B2 * | 5/2009 | Shimizu | C09K 11/7767 257/103 |
| 2002/0057204 | A1 * | 5/2002 | Bligh | G08B 7/062 340/691.1 |
| 2003/0234323 | A1 * | 12/2003 | Danielson | A62B 1/20 244/137.2 |
| 2005/0115794 | A1 * | 6/2005 | Zonneveld | B64D 25/14 193/5 |
| 2013/0213737 | A1 * | 8/2013 | Bambrick | A62B 1/20 182/18 |
| 2014/0009274 | A1 * | 1/2014 | Kohlmeier-Beckmann | B64D 25/14 340/425.5 |
| 2015/0097083 | A1 * | 4/2015 | Fellmann | B64D 9/00 244/137.2 |

* cited by examiner

EVACUATION SLIDE WITH A GUIDANCE MARKING

BACKGROUND OF THE INVENTION

The present invention relates to an evacuation slide which is provided with a visible guidance marking. Further, the invention relates to a vehicle, in particular an aircraft equipped with an evacuation slide of this kind.

Current passenger aircraft are equipped with inflatable evacuation slides which allow for evacuating passengers and crew members from an aircraft cabin after an emergency or crash landing of the aircraft. Typically, an inflatable evacuation slide is associated with a door or an emergency exit of the aircraft cabin such that persons leaving the aircraft cabin through the door or emergency exit can step on or jump on the evacuation slide and slide down the evacuation slide to the ground. Hence, the evacuation slides ensure that passengers and crew members can leave the aircraft cabin even in case the aircraft is of a size which does not allow a direct escape from the cabin to the ground.

Evacuation slides which are associated with aircraft cabin doors or emergency exits arranged in an aft or fore region of the aircraft cabin typically comprise a sliding face having a more or less constant inclination angle along its entire extension from the door or emergency exit to the ground. Hence, an evacuee leaving the aircraft cabin can directly jump out of the aircraft cabin onto the inclined sliding face of the evacuation slide. To the contrary, evacuation slides which are associated with aircraft cabin doors or emergency exits arranged in a midcabin or overwing area of the aircraft cabin, in order to allow deployment of the evacuation slides without being affected by the engines of the aircraft, typically comprise a sliding face which in a top end portion thereof is provided with a flat porch section. In the region of an edge of the flat porch section that faces away from the aircraft cabin door or emergency exit, the inclination of the sliding face changes, that is to say, when viewed in a moving direction of an evacuee leaving the aircraft cabin, the inclined section of the sliding face is arranged behind the flat porch section. An evacuee leaving the aircraft cabin therefore has to step out of the aircraft cabin onto the flat porch section of the sliding face first before being able to jump onto the inclined section of the sliding face when reaching the edge of the flat porch section that faces away from the aircraft cabin door or emergency exit.

Typically, an evacuation of all passengers on board the aircraft within 90 seconds has to be guaranteed with 50% of the doors available for evacuation. The maximum passenger number for a cabin equipped with, for example, four (4) Type A exit pairs is limited to 440 passengers. An increase of the passenger number thus requires equipping the aircraft cabin with an additional door or door pair which, however, might be undesirable because of the technical outlay, the costs and the weight. On the other hand, experience has shown that currently used evacuation slides are in principle capable of dealing flow rates more than the 110 person Type A exit rating. However, experience from tests indicates that many evacuees are reluctant to move as quickly as they could due to missing guidance and features providing a clear view about the descent, in particular in dark-of-night conditions.

DE 10 2010 055 704 A1 and WO 2012/084184 A1 therefore propose to equip a system for evacuating persons from a vehicle with a light signal generating device, which is adapted to emit at least one visual light signal that indicates at least one preset escape route for at least one person that is to be evacuated. The light signal generating device generates a visual light signal that may be discerned by a person and that informs and/or instructs the person, in which direction or at which location the person may reach safety in a hazardous situation. For example, the light signal generating device may be adapted to emit a light signal in the region of a dividing device, which divides an evacuation slide into a first slideway and a second slideway and extends substantially over the length of the evacuation slide. Alternatively or additionally, the light signal generating device may be adapted to display a light signal in a region of a top end of the evacuation slide which indicates a first position that is adjusted to a preset first entry point of the evacuation slide or in a region extending from the bottom end of the evacuation slide in a direction leading away from the evacuation slide.

SUMMARY OF THE INVENTION

The invention is directed to an object of providing an evacuation slide with a visible guidance marking which allows the improvement of guidance and orientation of persons being evacuated with the aid of the evacuation slide. Further, the invention is directed to an object of provide a vehicle, in particular an aircraft, which is equipped with an evacuation slide of this kind.

An evacuation slide according to the invention comprises a sliding face having a top end portion adapted to be positioned adjacent to an exit of a region to be evacuated. The exit may be an emergency exit or a regular door of the region to be evacuated. The region to be evacuated may be a building or a part of a building, but may also be a vehicle such as, for example, a ship, a train or an aircraft, or a part of a vehicle. The top end portion of the sliding face may be adapted to be positioned directly, that is to say, immediately, adjacent to the exit of the region to be evacuated. It is, however, also conceivable to design the top end portion of the sliding face in such a way that the top end portion of the sliding face is connectable to the exit of the region to be evacuated via a suitable transition element.

The sliding face further comprises a bottom end portion adapted to be positioned adjacent to an escape route leading away from the region to be evacuated and being arranged at a lower height than the region to be evacuated. The escape route may be a predefined route which may be marked so as to direct an evacuee, but may also be any arbitrary route which is not further defined, as long as it leads away from the region to be evacuated. For example, the escape route may be a predefined or not further defined route on the ground which leads away from the region to be evacuated which in turn is arranged at a certain elevation above the ground. At least a section of the sliding face of the evacuation slide thus defines an inclined slide path connecting the region to be evacuated to the escape route arranged at a lower elevation level. The evacuation slide thus is particularly suitable for use in a vehicle such as, for example, an aircraft for evacuating persons from a cabin positioned above the ground, since the evacuation slide allows persons leaving the vehicle cabin to quickly slide down to an escape route on the ground. After reaching the ground, the evacuees may move further away from the vehicle to be evacuated by following the escape route on the ground.

The sliding face of the evacuation slide, in the region of its top end portion, comprises a flat porch section which is connected to an inclined section of the sliding face via a transition section. The presence of the flat porch section allows the inclined section of the sliding face to be arranged at a desired distance from the exit of the region to be evacuated so as to avoid obstacles which might affect proper deployment and proper functioning of the evacuation slide. An evacuation slide which is provided with a sliding face having a flat porch section to be arranged immediately adjacent to the exit of the region to be evacuated is particularly suitable for being associated with an aircraft cabin door or an aircraft cabin emergency exit which is arranged in a midcabin or overwing area of the aircraft cabin, since the presence of the flat porch section allows the inclined section of the sliding face to be arranged at the necessary distance from the engines of the aircraft.

The sliding face is provided with at least one of a first guidance marking placed in the flat porch section of the sliding face and a second guidance marking placed in the transition section of the sliding face. The first guidance marking has a shape and orientation adapted to indicate a predefined evacuation direction in the inclined section of the sliding face. The first guidance marking thus provides a clear indication for an evacuee in which direction he or she has to move upon stepping out of the exit of the region to be evacuated onto the flat porch portion of the sliding face in order to reach the inclined section of the sliding face already in the correct predefined evacuation direction. The second guidance marking has a shape and orientation adapted to indicate a separation between the flat porch section and the inclined section of the sliding face. By means of the second guidance marking, the evacuee thus obtains a clear indication where the flat porch section of the sliding face ends and where the inclined, that is to say, the steep section of the sliding face begins.

As a result, the confidence of evacuees about to leave the region to be evacuated and to step on the sliding face of the evacuation slide is increased. Thus, hesitation can be avoided and the evacuation flow rate in the area of the top end portion of the sliding face can be increased. In addition, the second guidance marking increases the visible contrast between the flat porch section and the inclined section of the sliding face. As a consequence, an evacuee stepping out of the exit of the region to be evacuated onto the flat porch section of the sliding face is able to prepare for active movement when reaching the transition section between the flat porch section and the inclined section of the sliding face, that is to say, the evacuee is able to prepare for jumping onto the inclined section of the sliding face which leads to a reduced risk of injuries, for example, sprain or luxation, due to wrong a movement when reaching the inclined section of the sliding face unprepared. In summary, the evacuation slide allows improving guidance and orientation of persons being evacuated with the aid of the evacuation slide and hence helps not only to increase the evacuee flow rate from the region to be evacuated but also to reduce the risk of injuries to the evacuees.

In a preferred embodiment of the evacuation slide, the first guidance marking has the shape of an arrow. An arrow is particularly suitable to indicate the predefined evacuation direction in the inclined section of the sliding face, that is to say, by means of an arrow pointing in the predefined evacuation direction in the inclined section of the sliding face, evacuees, already upon walking across the flat porch section of the sliding face, are guided into the desired direction in which they have to move in the inclined section of the sliding face.

If desired, for example, in case the sliding face of the evacuation slide, at least in its inclined section, is divided into more than one independent slideway, the evacuation slide also may be provided with more than one first guidance marking. For example, an evacuation slide having a sliding face which, in its inclined section, is separated into two independent slideways may comprise two first guidance markings, in particular in the form of an arrow, which clearly show that there are two independent slideways and thus encourage the use of both slideways, even when one is partially obstructed. As a result, the first guidance markings counteract a possible preference of the evacuees to use the aft-most slideway instead of the forward-most slideway, resulting in an increase of the evacuee flow rate.

The second guidance marking preferably has the shape of the scratch line extending across the sliding face in the transition section thereof in a direction substantially perpendicular to the predefined evacuation direction in the inclined section of the sliding face. A scratch line is particularly suitable to indicate a separation between the flat porch section and the inclined section of the sliding face. Furthermore, a scratch line extending substantially perpendicular to the predefined evacuation direction in the inclined section of the sliding face provides a further indication for an evacuee stepping out of the exit of the region to be evacuated onto the flat porch section of the sliding face in which direction he or she has to move upon reaching the inclined section of the sliding face.

The scratch line may be designed in the form of a broken line being composed of individual line elements. The scratch line then can be easily recognized as a guidance marking that should indicate the end of the flat porch section and the beginning of the inclined section of the sliding face. In a preferred embodiment, each individual line element of the broken line defining the scratch line extends in a direction substantially parallel to the predefined evacuation direction in the inclined section of the sliding face. This design of the individual line elements provides an additional indication for an evacuee stepping out of the exit of the region to be evacuated onto the flat porch section of the sliding face in which direction he or she has to move upon reaching the inclined section of the sliding face.

Basically, the inclined section of the sliding face may extend from the flat porch section in a straight manner. Lateral edges of the inclined section of the sliding face then extend in the form of straight extensions from lateral edges of the flat porch section, that is to say, each lateral edge of the flat porch section and the corresponding adjacent lateral edge of the inclined section define an angle of 180°. Due to the presence of the flat porch section, the inclined section of the sliding face then may be arranged at a certain distance from the exit of the region to be evacuated. Proper deployment and proper functioning of the evacuation slide may, however, still be affected by obstacles arranged adjacent to the lateral edges of the inclined section of the evacuation slide's sliding face. This problem, in particular, arises when the evacuation slide is intended to be associated with an aircraft cabin door or an aircraft cabin emergency exit which is arranged in a midcabin or overwing area of the aircraft cabin close to the engines of the aircraft.

In order to address this problem, a lateral edge of the flat porch section and the corresponding adjacent lateral edge of the inclined section of the sliding face may define an angle of less than 180° such that projections of the flat porch section and the inclined section of the sliding face in a common plane are arranged in a slanted manner relative to each other. The inclined section of the sliding face then may be arranged not only at a desired distance from the exit of the region to be evacuated, but also offset in a slanted manner from the exit of the region to be evacuated. As a result, the inclined section of the sliding face may pass by an obstacle arranged adjacent to the lateral edges of the inclined section, such as, for example, an aircraft engine. The angle defined between the lateral edge of the flat porch section and the corresponding adjacent lateral edge of the inclined section of the sliding face may be selected as desired in dependence on the design of the region to be evacuated, that is to say, for example, in dependence on the design of an aircraft to be equipped with the evacuation slide. For example, the lateral edge of the flat porch section and the corresponding adjacent lateral edge of the inclined section of the sliding face may define an angle in the range of approximately 135° to 175°.

In an embodiment of the evacuation slide, wherein projections of the flat porch section and the inclined section of the sliding face in a common plane are arranged in a slanted manner relative to each other, an edge of the flat porch section which faces away from the transition section preferably is designed in the form of a straight edge adapted to be positioned adjacent to the exit of the region to be evacuated. The top end portion of the sliding face then can be arranged immediately adjacent to the exit of the region to be evacuated in a particularly simple manner. An edge of the flat porch section which faces the transition section and thus also the transition section itself, however, preferably extend in a slanted manner relative to the edge of the flat porch section which faces away from the transition section. A surface of the flat porch section then has a trapezoidal shape. To the contrary, in an embodiment of the evacuation slide, wherein the inclined section of the sliding face extends from the flat porch section in a straight manner, the edge of the flat porch section which faces away from the transition section and the edge of the flat porch section which faces the transition section both may be designed in the form of straight edges and may extend substantially parallel to each other. A surface of the flat porch section then may have a rectangular shape.

Evacuees stepping out of the exit of the region to be evacuated onto the flat porch section of the sliding face have the tendency to move in a straight direction. Thus, movement of the evacuees across the flat porch section of the sliding face towards the inclined portion of the sliding face may be disturbed by the fact that the edge of the flat porch section which faces the transition section and thus also the transition section itself extend in a slanted manner relative to the straight edge of the flat porch section which faces away from the transition section. A first guidance marking which, already in the area of the flat porch section, provides an indication for the evacuees on the predefined evacuation direction in the inclined section of the sliding face thus, also already in the area of the porch section, redirects the evacuees from their usual straight direction of movement into the direction of movement the evacuees have to assume upon reaching the inclined section of the sliding face. As a result, hesitation and pile-up of evacuees moving across the flat porch section of the sliding face can be reduced.

In particular, the first guidance marking, in order to indicate the predefined evacuation direction in the inclined section of the sliding face, may extend across the flat porch section in a slanted manner relative to the edge of the flat porch section which faces away from the transition section. In case the first guidance marking is designed in the form of an arrow or in the form of another substantially line-shaped marking, the first guidance marking, in dependence on the slanted arrangement of the inclined section of the sliding face relative to the flat porch section of the sliding face, may, for example, extend at an angle of less than 90°, preferably at an angle of approximately 50° to 85° relative to the edge of the flat porch section which faces away from the transition section. To the contrary, in an embodiment of the evacuation slide, wherein the inclined section of the sliding face extends from the flat porch section in a straight manner, the first guidance marking may extend across the flat porch section in a direction perpendicular to the edge of the flat porch section which faces away from the transition section and the edge of the flat porch section which faces the transition section.

In an embodiment of the evacuation slide, wherein projections of the flat porch section and the inclined section of the sliding face in a common plane are arranged in a slanted manner relative to each other, the second guidance marking, in order to indicate a separation between the flat porch section and inclined section of the sliding face, may extend along the edge of the flat porch section which faces the transition section and hence along the transition section itself in a slanted manner relative to the edge of the flat porch section which faces away from the transition section. The second guidance marking then provides an additional indication for an evacuee on the predefined evacuation direction in the inclined section of the sliding face, in particular in case the second guidance marking is designed in the form of a broken scratch line with individual line elements extending substantially parallel to the predefined evacuation direction in the inclined section of the sliding face. To the contrary, in an embodiment of the evacuation slide, wherein the inclined section of the sliding face extends from the flat porch section in a straight manner, the second guidance marking may extend across the flat porch section substantially parallel to both the edge of the flat porch section which faces away from the transition section and the edge of the flat porch section which faces the transition section.

At least one of the first guidance marking and the second guidance marking may comprise a fluorescent material which is adapted to emit fluorescent radiation. At least one of the first guidance marking and the second guidance marking may be bonded to the sliding face of the evacuation slide. It is, however, also conceivable to paint at least one of the first guidance marking and the second guidance marking onto the sliding face of the evacuation slide. The fluorescent material then may be contained in the paint used for generating the at least one of the first guidance marking and the second guidance marking. A guidance marking which is adapted to emit fluorescent radiation is still clearly visible to an evacuee, also in bad visibility conditions, for example, due to smoke or fog or in dark-of-night conditions.

In a particularly preferred embodiment, the fluorescent material is adapted to emit fluorescent radiation when being irradiated with blue light. The fluorescent material then may be caused to emit fluorescent radiation also in daylight conditions when being irradiated with blue light contained in the daylight spectrum.

The evacuation slide preferably further comprises a light signal generating device adapted to irradiate light onto at least one of the first guidance marking and the second guidance marking. Preferably, the light irradiated by the light signal generating device is suitable to cause the at least one of the first guidance marking and the second guidance marking to emit fluorescent radiation. The light signal generating device thus is particularly suitable to induce the emission of fluorescent radiation from the at least one of the first guidance marking and the second guidance marking in dark-of-night conditions when no daylight is available.

In particular, the light signal generating device may be adapted to irradiate UV-light onto the at least one of the first guidance marking and the second guidance marking.

The light signal generating device may comprise a first lighting element. Alternatively or additionally thereto, the light signal generating device may comprise a second lighting element. A light signal generating device which is equipped with two lighting elements provides for at least some redundancy in case of failure of one of the lighting elements. The light signal generating device may further comprise an energy source, for example, in the form of a battery, an accumulator, or the like which provides the lighting element(s) with electric energy. Moreover, the light signal generating device may comprise a control unit which may be adapted to control the supply of energy to the lighting element(s) and/or which may be adapted to control the operation of the lighting element(s). For example, the control unit may be adapted to control the lighting element(s) in such a manner that the lighting element(s) emit(s) a continuous light signal or a light signal with changing intensity or color over time.

In a preferred embodiment of the evacuation slide, the first lighting element is arranged in a first lateral edge portion of the evacuation slide in the area of the flat porch section and is adapted to irradiate light in an irradiation direction directed towards a center portion of the flat porch section of the sliding face. The first lighting element then is suitable to irradiate light onto the at least one of the first guidance marking and the second guidance marking while being arranged at a position outside of the evacuation path of the evacuees in the flat porch section of the sliding face.

Alternatively or additionally, the second lighting element may be arranged in a second lateral edge portion of the evacuation slide opposite the first lateral edge portion in the area of the flat porch section and may be adapted to irradiate light in an irradiation direction directed towards a center portion of the flat porch section of the sliding face. The second lighting element then is also suitable to irradiate light onto the at least one of the first guidance marking and the second guidance marking while being arranged at a position outside of the evacuation path of the evacuees in the flat porch section of the sliding face. A light signal generating device having a first lighting element arranged in a first lateral edge region of the evacuation slide and a second lighting element arranged in a second lateral edge region of the evacuation slide opposite to the first lighting element also is particularly suitable for illuminating the top end portion of a sliding face which, at least in its inclined section, is divided into two independent slideways which may be separated from each other, for example, by means of a dividing element extending along the inclined section of the sliding face in the center portion thereof.

At least one of the first lighting element and the second lighting element may be fixed to a lateral limitation element extending from the sliding face along a lateral edge thereof. The lateral limitation element may serve to prevent evacuees from falling off the evacuation slide while sliding down the sliding face and hence preferably extends from the sliding face to a certain height. Using a lateral limitation element for attaching the at least one of the first lighting element and the second lighting element allows dispensing with an additional arrangement for positioning and fixing the lighting element(s).

Preferably, at least one of the first lighting element and the second lighting element is fixed to a wall portion of the lateral limitation element which faces the center portion of the flat porch section of the sliding face. The lighting element(s) then is/are arranged in an optimum position for irradiating light onto the at least one of the first guidance marking and the second guidance marking and in a direction towards a center portion of the flat porch section of the sliding face from slightly above the sliding face.

A vehicle according to the invention comprises an evacuation slide as described above.

Preferably, the vehicle is a passenger vehicle, in particular an aircraft.

BRIEF DESCRIPTION OF THE DRAWINGS

A preferred embodiment of the invention is now described in greater detail with reference to the appended schematic drawings wherein.

DETAILED DESCRIPTION OF THE PREFERRED EMBODIMENTS

Figure 1:
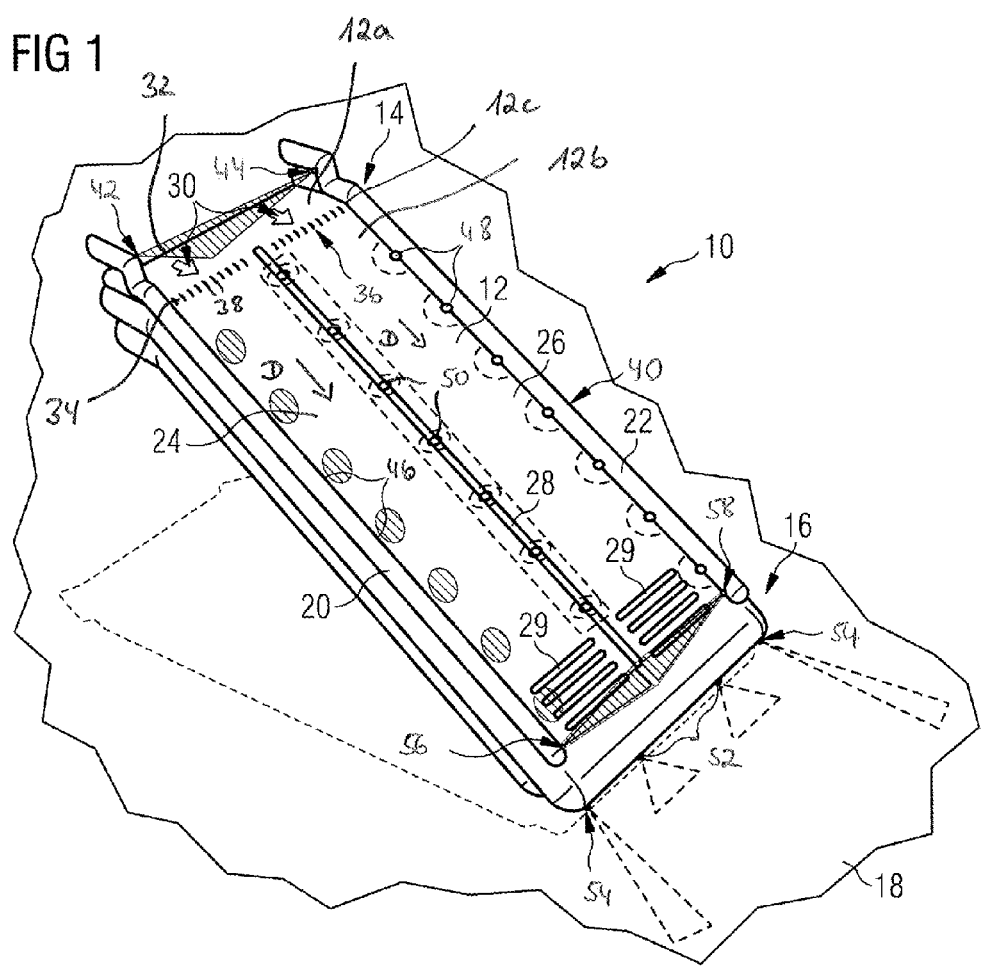
FIG. 1 shows a three dimensional view of a first embodiment of an evacuation slide.
Figure 2:
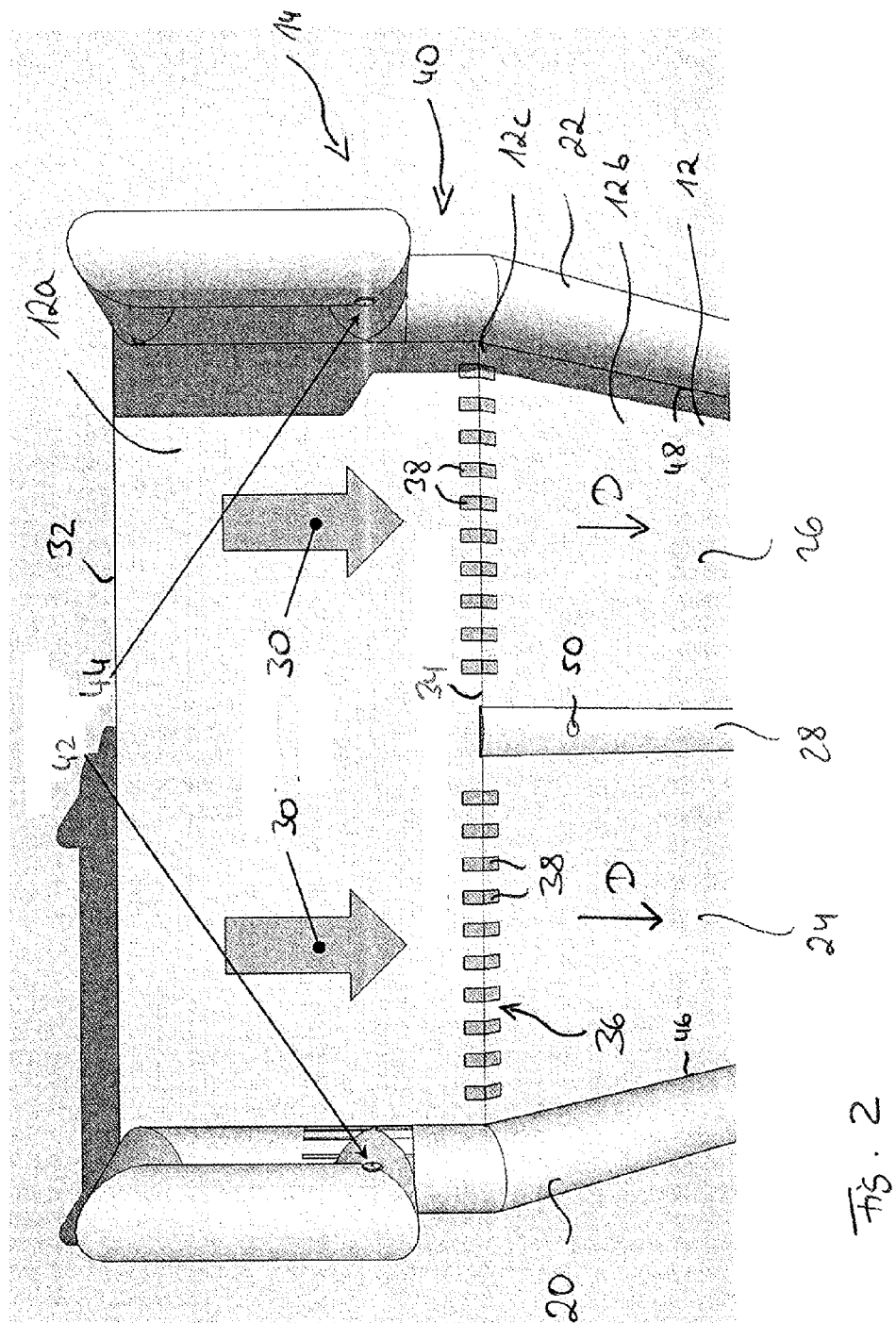
FIG. 2 shows a detailed three dimensional view of a top end portion of the evacuation slide according to FIG. 1.

An evacuation slide 10 shown in FIGS. 1 to 2 is designed in the form of an inflatable device which, when not in use, is stowed as a compact package close to an exit of a region to be evacuated. The evacuation slide 10 comprises a sliding face 12 having a top end portion 14 which is adapted to be positioned adjacent to the exit of the region to be evacuated, and a bottom end portion 16 adapted to be positioned adjacent an escape route 18 leading away from the region to be evacuated and being arranged at a lower height than the region to be evacuated. The sliding face 12, in the region of its top end portion 14, comprises a flat porch section 12*a* which is connected to an inclined section 12*b* of the sliding face 12 via a transition section 12*c*. An evacuee exiting the region to be evacuated thus first steps onto the flat porch section 12*a* before jumping onto the inclined section 12*b* of the sliding face 12 which defines an inclined slide path connecting the flat porch section 12*a* and hence the region to be evacuated to the escape route 18 which, relative to the region to be evacuated, is arranged at a lower elevation level. A surface of the flat porch section 12*a* has a rectangular shape.

The evacuation slide 10 is in particular suitable for use in an aircraft to evacuate passengers and crew members from an aircraft cabin in case of an emergency. Thus, when inflated, as shown in the Figures, the evacuation slide 10 extends from a door or an emergency exit of the aircraft cabin downwards in the direction of the ground. The escape route 18 extends on the ground and leads away from the aircraft to be evacuated.

In a first lateral edge portion, the evacuation slide 10 is provided with a first lateral limitation element 20. The first lateral limitation element 20 extends upwards from the sliding face 12 and serves to prevent persons sliding down the sliding face 12 of the evacuation slide 10 from falling off the evacuation slide 10. Similarly, a second lateral limitation element 22 is arranged in a second lateral edge portion of the evacuation slide 10 which also extends upwards from the sliding face 12 and also serves to prevent persons sliding down the sliding face 12 of the evacuation slide from falling off the evacuation slide 10. The sliding face 12 of the evacuation slide 10 is divided into two separate slideways 24, 26 which are separated from each other by a dividing element 28 extending in a center region of the inclined section 12b of the sliding face 12 upwards from the sliding face 12. In the bottom end portion 16 of the sliding face 12, decelerations panels 29 are provided for each slideway 24, 26 which have a coarse surface and which serve to decelerate the sliding movement of an evacuee sliding down the evacuation slide 10 before reaching the bottom end of the evacuation slide 10.

In the region of its top end portion 14, the sliding face 12 is provided with two first guidance markings 30 placed in the flat porch section 12a of the sliding face 12 and having a shape and orientation adapted to indicate a predefined evacuation direction D in the inclined section 12b of the sliding face 12. Both first guidance markings 30 are designed in the shape of an arrow and, in the embodiment of an evacuation slide 10 depicted in FIGS. 1 and 2, extend in a direction substantially perpendicular to an edge 32 of the flat porch section 12a which faces away from the transition section 12c and an edge 34 of the flat porch section 12a which faces the transition section 12c. By means of the first guidance markings 30, evacuees are directed into the two parallel slideways 24, 26 defined on the sliding face 12, that is to say, the first guidance markings 30, already in the flat porch section 12a of the sliding face 12, direct evacuees exiting the region to be evacuated into the predefined evacuation direction D in which they have to move upon reaching the inclined section 12b of the sliding face 12.

Furthermore, the sliding face 12, in the region of its top end portion 14, is provided with a second guidance marking 36 which is placed in the transition section 12c of the sliding face 12 and has a shape and orientation adapted to indicate a separation between the flat porch section 12a and the inclined section 12b of the sliding face 12. The second guidance marking 36 has the shape of a scratch line which extends across the sliding face 12 in the transition section 12c thereof substantially perpendicular to the predefined evacuation direction D in the inclined section 12b of the sliding face 12 from the first lateral limitation element 20 to the second lateral limitation element 22. In the embodiment of an evacuation slide 10 depicted in FIGS. 1 and 2, the second guidance marking 36 extends in a direction substantially parallel to the edge 32 of the flat porch section 12a which faces away from the transition section 12c and the edge 34 of the flat porch section 12a which faces the transition section 12c.

As becomes apparent in particular from the detailed view according to FIG. 2, the scratch line defining the second guidance marking 36 is designed in the form of a broken line being composed of individual line elements 38. Each individual line element 38 extends in a direction substantially parallel to the predefined evacuation direction D in the inclined section 12b of the sliding face 12 and, in the embodiment of an evacuation slide 10 depicted in FIGS. 1 and 2, in a direction substantially perpendicular to the edge 32 of the flat porch section 12a which faces away from the transition section 12c and the edge 34 of the flat porch section 12a which faces the transition section 12c. Besides indicating to an evacuee where the flat porch section 12a ends and the inclined section 12b of the sliding face 12 begins, the second guidance marking 36 thus provides additional guidance for an evacuee regarding the predefined evacuation direction D in the inclined section 12b of the sliding face 12.

The first guidance markings 30 and the second guidance marking 36, which may be bonded to or painted onto the sliding face 12 of the evacuation slide 10, comprise a fluorescent material which emits fluorescent radiation when being irradiated with blue light. The fluorescent material thus is caused to emit fluorescent radiation also in daylight conditions when being irradiated with blue light contained in the daylight spectrum.

In order to improve visibility of the first guidance markings 30 and the second guidance marking 36 in bad visibility conditions, for example, due to smoke or fog or in dark-of-night conditions, the evacuation slide 10 further comprises a light signal generating device 40 adapted to irradiate light, in particular UV-light, onto the first guidance markings 30 and the second guidance marking 36. The light irradiated by the light signal generating device 40 is suitable to cause the first guidance markings 30 and the second guidance marking 36 to emit fluorescent radiation which renders the markings 30, 36 clearly visible, also in bad visibility conditions.

The light signal generating device 40 comprises a first lighting element 42 adapted to irradiate UV light and a second lighting element 44 adapted to irradiate UV light. The first lighting element 42 is arranged in the first lateral edge portion of the evacuation slide 10 in the area of the flat porch section 12a and is adapted to irradiate light in an irradiation direction directed towards a center portion of the flat porch section 12a of the sliding face 12. Specifically, the first lighting element 42 is fixed to the first lateral limitation element 20 at a wall portion thereof which faces the center portion of the flat porch section 12a of the sliding face 12.

The second lighting element 44 is arranged in the second lateral edge portion of the evacuation slide 10 in the area of the flat porch section 12a and hence opposite to the first lighting element 42. The second lighting element 42 is also adapted to irradiate light in an irradiation direction directed towards a center portion of the flat porch section 12a of the sliding face 12. Thus, the first lighting element 40 and the second lighting element 42 irradiate light in opposed irradiation directions so as to ensure proper irradiation of the first and the second guidance markings 30, 36. The second lighting element 42 is fixed to the second lateral limitation element 22 at a wall portion thereof which faces the center portion of the flat porch section 12a of the sliding face 12.

The first and the second lighting element 42, 44 are supplied with electric energy from an energy source of the light signal generating device 40 which may, for example, be designed in the form of a battery or an accumulator (not shown in the Figures). Operation of the first and the second lighting element 42, 44 is controlled by a control unit (not shown in the Figures) of the light signal generating device 40. Usually, the control unit controls the first and the second lighting element 42, 44 so as to emit a continuous UV-light signal. It is, however, also conceivable to design and control the first and the second lighting element 42, 44 so as to emit a UV-light signal having a varying intensity over time.

The light signal generating device 40 further comprises a plurality of third and fourth lighting elements 46, 48 which are fixed to the first and the second lateral limitation elements 20, 22 at wall portions thereof which face the center portion of the inclined section 12b of the sliding face 12, that is to say, the dividing element 28, along the inclined section 12b of the sliding face 12. The third and fourth lighting elements 46, 48 serve to illuminate the inclined section 12b of the sliding face 12. Fifth lighting elements 50 are attached to the dividing element 28. Sixth lighting elements 52 are attached to the bottom end of the evacuation slide 10 and serve to illuminate the escape route 18. Seventh lighting elements 52 are provided in edge regions of the bottom end of the evacuation slide 10 which serve to provide guidance for the evacuees regarding the direction of the escape route 18. Finally, the light signal generating device 40 comprises eighth lighting elements 56, 58 which serve to illuminate the bottom end portion 16 of the sliding face 12, but not the escape route 18 or the ground adjacent to the escape route 18 in order to enhance the brightness contrast between the bottom end portion 16 of the sliding face 12 and the escape route 18.

The operation of the third to eighth lighting elements 46, 48, 50, 52, 54, 56, 58, like the operation of the first and the second lighting element 42, 44, is controlled by means of the control unit of the light signal generating device 40. Furthermore, the third to eighth lighting elements 46, 48, 50, 52, 54, 56, 58, like the first and the second lighting element 42, 44, are supplied with energy from the energy source of the light signal generating device 40.

In the embodiment of an evacuation slide 10 which is shown in FIGS. 1 to 2, the inclined section 12b of the sliding face 12 extends from the flat porch section 12a in a straight manner, that is to say, lateral edges of the inclined section 12b of the sliding face 12 extend in the form of straight extensions from lateral edges of the flat porch section 12a at an angle of 180°. Due to the presence of the flat porch section 12a in the top end portion 14 of the sliding face 12, the inclined section 12b of the sliding face 12 is arranged at a certain distance from the exit of the region to be evacuated. However, proper deployment and proper functioning of the evacuation slide 10 may still be affected by obstacles arranged adjacent to the lateral edges of the inclined section 12b of the sliding face 10. This problem in particular arises when the evacuation slide 10 is intended to be associated with an aircraft cabin door or an aircraft cabin emergency exit which is arranged in a midcabin or overwing area of the aircraft cabin close to the engines of the aircraft.

Figure 3:
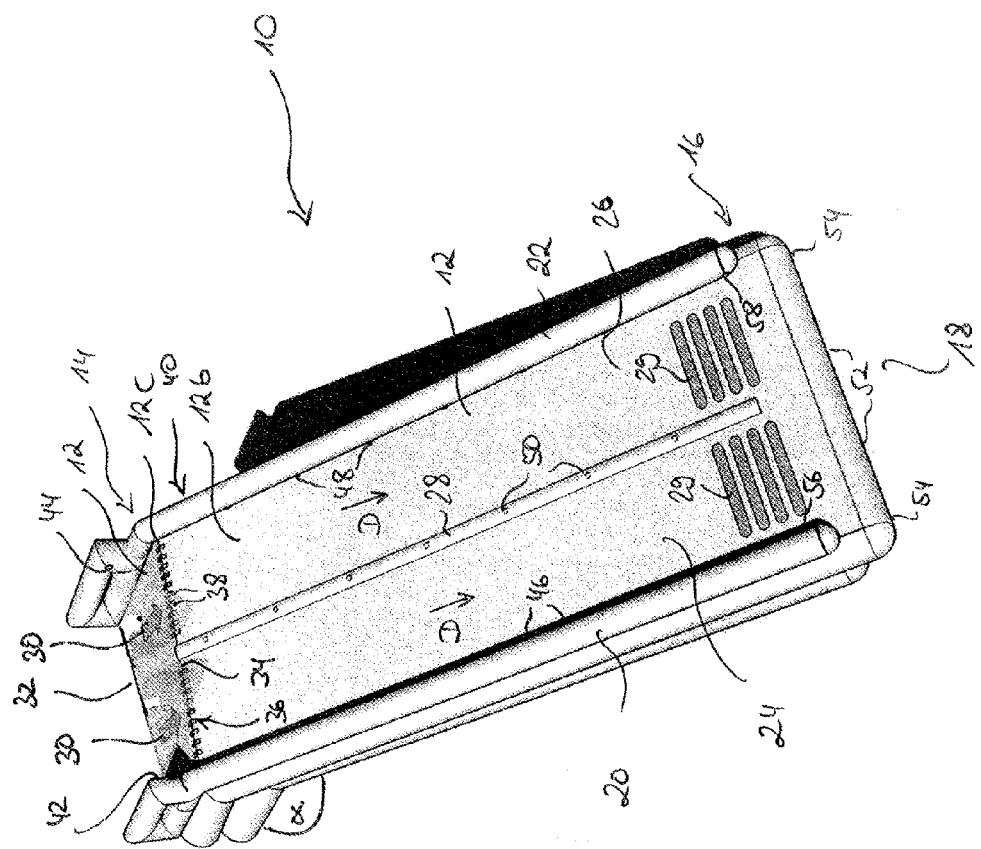
FIG. 3 shows a three dimensional view of a further embodiment of an evacuation slide.
Figure 4:
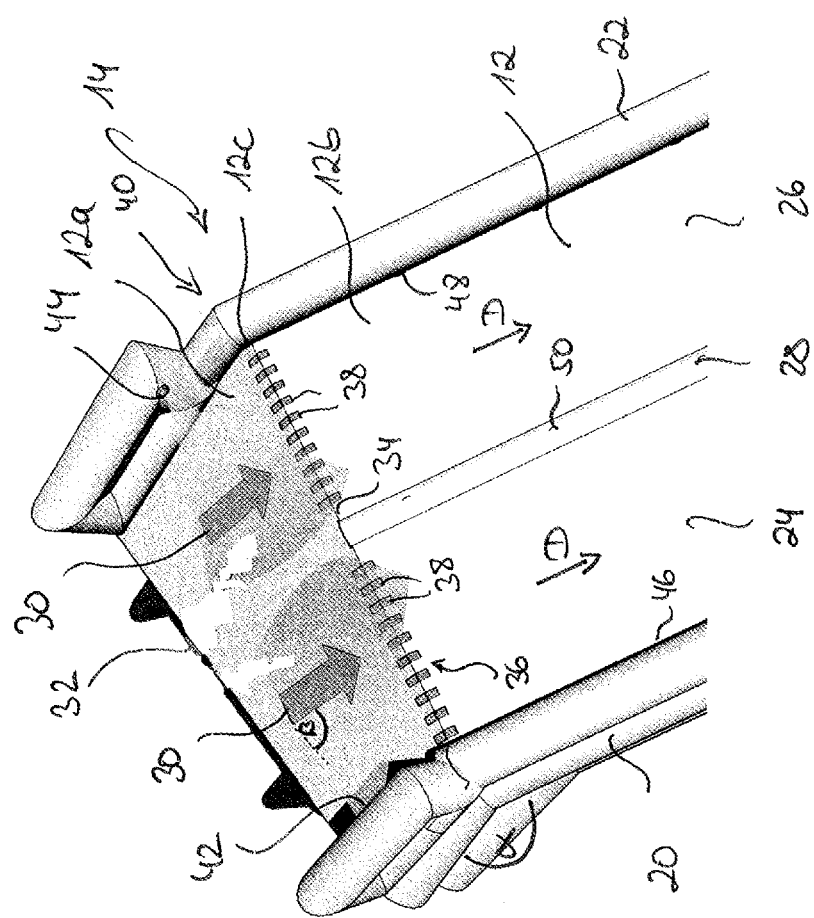
FIG. 4 shows a detailed three dimensional view of a top end portion of the evacuation slide according to FIG. 3.

In the embodiment of an evacuation slide 10, which is shown in FIGS. 3 to 4, a lateral edge of the flat porch section 12a and the corresponding adjacent lateral edge of the inclined section 12b of the sliding face 12 therefore define an angle α of less than 180° such that projections of the flat porch section 12a and inclined section 12b of the sliding face 12 in a common plane are arranged in a slanted manner relative to each other. In the embodiment of an evacuation slide 10 shown in the drawings, the lateral edge of the flat porch section 12a and the corresponding adjacent lateral edge of the inclined section 12b of the sliding face 12 in particular define an angle α of 155°. The inclined section 12b of the sliding face 12 thus is arranged not only at a desired distance from the exit of the region to be evacuated, but also offset in a slanted manner from the exit of the region to be evacuated. As a result, the inclined section 12b of the sliding face 12 may pass by, for example, an aircraft engine.

In the embodiment of an evacuation slide 10 according to FIGS. 3 to 4, the edge 32 of the flat porch section 12a which faces away from the transition section 12c, like in the embodiment of an evacuation slide 10 depicted in FIGS. 1 to 2, is designed in the form of a straight edge adapted to be positioned adjacent to the exit of the region to be evacuated. The edge 34 of the flat porch section 12a which faces the transition section 12c and thus also the transition section 12c itself, however, extend in a slanted manner relative to the edge 32 of the flat porch section 12a which faces away from the transition section 12c. A surface of the flat porch section 12a thus has a trapezoidal shape.

In order to take account for the slanted arrangement of the flat porch section 12a and the inclined section 12b of the sliding 12 relative to each other, the first guidance markings 30, in the embodiment of an evacuation slide 10 according to FIGS. 3 to 4, extend across the flat porch section 12a in a slanted manner, that is to say, at an angle β of approximately 80° relative to the edge 32 of the flat porch section 12a which faces away from the transition section 12c. Hence, the first guidance markings 30, despite the slanted arrangement of the flat porch section 12a and the inclined section 12b of the sliding 12 relative to each other, still indicate the predefined evacuation direction D in the inclined section 12b of the sliding face 12.

In addition, the second guidance marking 36 extends along the edge 34 of the flat porch section 12a which faces the transition section 12c and hence along the transition section 12c itself in a slanted manner relative to the edge 32 of the flat porch section 12a which faces away from the transition section 12c. Moreover, the individual line elements 38 defining the scratch line design of the second guidance marking 36, which extend substantially parallel to the predefined evacuation direction D in the inclined section 12b of the sliding face 12 extend substantially parallel to the first guidance markings 30 in a slanted manner relative to the edge 32 of the flat porch section 12a which faces away from the transition section 12c.

The slanted arrangement of the first and the second guidance markings 30, 36 counteracts the tendency of evacuees stepping out of the exit of the region to be evacuated onto the flat porch section 12a of the sliding face 12 to move in a straight direction. Specifically, the first and the second guidance markings 30, 36 redirect the evacuees from their usual straight direction of movement into the direction of movement the evacuees have to assume upon reaching the inclined section 12b of the sliding face 12. As a result, hesitation and pile-up of evacuees moving across the flat porch section 12a of the sliding face 12 can be reduced.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An evacuation slide comprising:
   a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated,
   wherein the sliding face, in the region of its top end portion, comprises a flat porch section which is connected to an inclined section of the sliding face via a transition section,
   wherein the sliding face is provided with a first guidance marking placed in the flat porch section of the sliding face and having a shape and orientation adapted to indicate a predefined evacuation direction in the inclined section of the sliding face, wherein a light signal generating device comprising a first lighting element is adapted to irradiate a light signal downward onto the first guidance marking, wherein the first lighting element is not located on a planar surface of the sliding face,
   wherein the first lighting element is fixed to a lateral limitation element extending from the sliding face along a lateral edge thereof,
   wherein the first guidance marking comprises a fluorescent material which is adapted to emit fluorescent radiation.

2. The evacuation slide according to claim 1, wherein the first guidance marking has the shape of an arrow.

3. The evacuation slide according to claim 1, wherein a lateral edge of the flat porch section and a corresponding adjacent lateral edge of the inclined section of the sliding face define an angle of less than 180° such that projections of the flat porch section and the inclined section of the sliding face in a common plane are arranged in a slanted manner relative to each other.

4. The evacuation slide according to claim 3, wherein an edge of the flat porch section which faces away from the transition section is designed in the form of a straight edge adapted to be positioned adjacent to the exit of the region to be evacuated, and wherein an edge of the flat porch section which faces the transition section extends in a further slanted manner relative to the edge of the flat porch section which faces away from the transition section.

5. The evacuation slide according to claim 4, wherein the first guidance marking, in order to indicate the predefined evacuation direction in the inclined section of the sliding face, extends across the flat porch at an angle less than 90° relative to the edge of the flat porch section which faces away from the transition section.

6. The evacuation slide according to claim 3, wherein the first guidance marking, in order to indicate the predefined evacuation direction in the inclined section of the sliding face, extends across the flat porch section at an angle less than 90° relative to the edge of the flat porch section which faces away from the transition section.

7. The evacuation slide according to claim 1, wherein the sliding face is provided with a second guidance marking placed in the transition section of the sliding face.

8. The evacuation slide according to claim 7, wherein a lateral edge of the flat porch section and a corresponding adjacent lateral edge of the inclined section of the sliding face define an angle of less than 180° such that projections of the flat porch section and the inclined section of the sliding face in a common plane are arranged in a slanted manner relative to each other,
wherein an edge of the flat porch section which faces away from the transition section is designed in the form of a straight edge adapted to be positioned adjacent to the exit of the region to be evacuated, and wherein an edge of the flat porch section which faces the transition section extends in a further slanted manner relative to the edge of the flat porch section which faces away from the transition section, and
wherein the second guidance marking, in order to indicate a separation between the flat porch section and the inclined section of the sliding face, extends along the edge of the flat porch section which faces the transition section at an angle less than 90° relative to the edge of the flat porch section which faces away from the transition section.

9. The evacuation slide according to claim 7, wherein the second guidance marking comprises a further fluorescent material which is adapted to emit fluorescent radiation.

10. The evacuation slide according to claim 9, wherein the light signal generating device is adapted to irradiate a light signal onto the second guidance marking which is suitable to cause the second guidance marking to emit fluorescent radiation.

11. The evacuation slide according to claim 10, wherein the light signal generating device is adapted to irradiate UV-light onto the at least one of the first guidance marking and the second guidance marking.

12. The evacuation slide according to claim 10, wherein the light signal generating device a second lighting element.

13. The evacuation slide according to claim 12, wherein the second lighting element is arranged in a second lateral edge portion of the evacuation slide opposite the first lateral edge portion in the area of the flat porch section and is adapted to irradiate light in an irradiation direction directed towards a center portion of the flat porch section of the sliding face.

14. The evacuation slide according to claim 12, wherein the second lighting element is fixed to the lateral limitation element extending from the sliding face.

15. The evacuation slide according to claim 14, wherein at least one of the first lighting element and the second lighting element is fixed to a wall portion of the lateral limitation element which faces the center portion of the flat porch section of the sliding face.

16. The evacuation slide according to claim 1, wherein the fluorescent material is adapted to emit fluorescent radiation when being irradiated with blue light.

17. The evacuation slide according to claim 1, wherein the first lighting element is arranged in a first lateral edge portion of the evacuation slide in the area of the flat porch section and is adapted to irradiate light in an irradiation direction directed towards a center portion of the flat porch section of the sliding face.

18. An evacuation slide comprising:
a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated, wherein the sliding face, in the region of its top end portion, comprises a flat porch section which is connected to an inclined section of the sliding face via a transition section, and
wherein the sliding face is provided with a guidance marking placed in the transition section of the sliding face,
wherein the guidance marking is a scratch line extending across the sliding face, in the transition section thereof,
wherein the scratch line is a broken line composed of individual line elements arranged side by side in a direction substantially perpendicular to the predefined evacuation direction in the inclined section of the sliding face, and
wherein each individual line element extends in a direction substantially parallel to the predefined evacuation direction in the inclined section of the sliding face.

19. A vehicle comprising an evacuation slide comprising:
a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated,
wherein the sliding face, in the region of its top end portion, comprises a flat porch section which is connected to an inclined section of the sliding face via a transition section,
wherein the sliding face is provided with a guidance marking placed in the flat porch section of the sliding face, wherein a light signal generating device comprising a lighting element is adapted to irradiate a light signal downward onto the guidance marking, wherein the first lighting element is not located on a planar surface of the sliding face, wherein the lighting element is fixed to a lateral limitation element extending from the sliding face along a lateral edge thereof, and wherein the guidance marking comprises a fluorescent material which is adapted to emit fluorescent radiation.

20. The vehicle according to claim 19, wherein the vehicle is an aircraft.

21. An evacuation slide comprising:

a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated, wherein the sliding face, in the region of its top end portion, comprises a flat porch section which is connected to an inclined section of the sliding face via a transition section, wherein the sliding face is provided with a guidance marking placed in the transition section of the sliding face and having a shape and orientation adapted to indicate a separation between the flat porch section and the inclined section of the sliding face, wherein a light signal generating device comprising a lighting element is adapted to irradiate a light signal downward onto the guidance marking, wherein the first lighting element is not located on a planar surface of the sliding face, wherein the lighting element is fixed to a lateral limitation element extending from the sliding face along a lateral edge thereof, and wherein the guidance marking comprises a fluorescent material which is adapted to emit fluorescent radiation.

\* \* \* \* \*